United States Patent [19]
Adler et al.

[11] Patent Number: 4,766,424
[45] Date of Patent: Aug. 23, 1988

[54] LIGHT COLLECTING AND REDIRECTING MEANS

[75] Inventors: Robert Adler, Northfield; Paul Strauss, Chicago, both of Ill.

[73] Assignee: Zenith Electronics Corporation, Glenview, Ill.

[21] Appl. No.: 595,170

[22] Filed: Mar. 30, 1984

[51] Int. Cl.⁴ .............................................. G09G 3/00
[52] U.S. Cl. ............................... 340/712; 340/365 P; 250/221
[58] Field of Search .............. 340/712, 365 P, 815.31; 250/221, 227; 350/96.1, 96.17, 96.18, 96.19; 40/547, 583

[56] References Cited

U.S. PATENT DOCUMENTS

| | | | |
|---|---|---|---|
| 3,060,319 | 10/1962 | Greunke | 250/227 |
| 3,611,359 | 10/1971 | Panerai et al. | 340/815.31 |
| 3,775,560 | 11/1973 | Ebeling et al. | 178/18 |
| 4,305,071 | 12/1981 | Bell et al. | 340/712 |
| 4,320,292 | 3/1982 | Oikawa et al. | 250/221 |
| 4,459,476 | 7/1984 | Weissmueller et al. | 340/712 |

Primary Examiner—Marshall M. Curtis
Assistant Examiner—Mahmoud Fatahi-Yar

[57] ABSTRACT

An improved light collector, for collecting the light in a plurality of parallel light beams directed across the display surface of a touch panel apparatus and for redirecting it in a direction substantially perpendicular to the light beams for detection by a common detector positioned adjacent one end of the collector, comprises an elongated strip of light transmissive material terminated by a light collection station. A plurality of light reflecting elements is disposed inside and spaced along one side of the strip and each has a transverse dimension small in comparison to cross-section of the strip. The surface of each reflecting element is tilted with respect to the longitudinal axis of the strip. A like plurality of focusing elements is also disposed along the strip and each such element is individually associated with an assigned one of the reflecting elements. Each of the focusing elements is oriented and configured to collect light received in a direction substantially perpendicular to the longitudinal axis of the strip and to direct such collected light to its assigned reflecting element. Each of the focusing elements is spaced from its assigned reflecting element a distance such that the reflecting element is positioned at, or close to, the focal plane of its assigned focusing element. Each reflecting element is so tilted as to direct light received from its assigned focusing element to the light collection station.

13 Claims, 3 Drawing Sheets

LIGHT COLLECTING AND REDIRECTING MEANS

THE BACKGROUND OF THE INVENTION

This invention relates in general to a touch control arrangement for use in graphics display apparatus and in particular to an improved light collector, or guide, for use in such an arrangement.

Graphics display apparatus, of the type herein considered, generally utilize a cathode ray tube (CRT), although other types of display devices can also be used. In any event, each of two adjacent edges of the display surface (faceplate) of the CRT is provided with a bank of light sources arranged to develop a group of parallel light beams which extend across the faceplate, the two groups intersecting, preferably at right angles. Like banks of light detectors flank those sides of the faceplate opposite an assigned bank of light sources.

In practice, a particular graphic is delivered for display by a controller in response to an operator's command which can take the form of a pointing to one area of the faceplate. This pointing serves to interrupt one or more of the light beams, which interruption causes the beam's assigned light detector to develop a signal which is applied to the controller to select the particular graphic. U.S. Pat. No. 3,775,560, for example, exemplifies this type display apparatus.

Display apparatus of the type adverted to above tend to be rather costly since a separate light sensor is employed with each light source. By way of reducing the number of light sensors, a novel light collecting arrangement is disclosed in co-pending application Ser. No. 408,096 filed on Aug. 13, 1982, now abandoned which application is a continuation-in-part of application Ser. No. 264,725 filed May 18, 1981 now abandoned. The '096 application discloses a light collection scheme which employs two sheets of light transmissive material such as plexiglass which are disposed on adjacent sides of the cathode ray tube's faceplate. The forward end of each sheet receives light from the bank of light sources disposed opposite thereto and directs such light to a light collection area at the opposite end of the sheet. In one embodiment, a light sensor is disposed at each light collection area. In a preferred embodiment, however, a single light sensor is utilized to respond to both light collection areas.

While this arrangement reduces the number of light sensors required to respond to a multitude of light sources, the configuration of the light collecting sheet poses problems insofar as the designs of the CRT's cabinet and escutcheon are concerned. In particular, the extent to which compactness can be achieved is subject to the overall size, as well as shape, of the light collectors.

Another problem which plagues graphics display apparatus of the type considered is the desensitization of the light detectors by strong ambient light sources. In bright rooms or in bright daylight, the ambient light can cause the apparatus to display erroneous information, or, in the worst case, to be rendered inoperative. This can occur when ambient light stimulates the light detectors to such an extent as to render the detectors insensitive to the desired light beams.

OBJECT OF THE INVENTION

It is therefore a general object of the invention to provide an improved graphics display apparatus.

It is a specific object of the invention to provide a compact light collecting arrangement for use with a graphics display device.

It is also an object of the invention to provide a light guide for use with graphics display apparatus which imposes but minimal limitations on cabinet and escutcheon design.

It is another object of the invention to provide a light collector, or guide, for use with a graphics display device which is substantially immune to ambient light.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

The subject invention finds application in a wide variety of graphics display systems of the type controlled by detecting the interruption of intersecting paths of visible light or infrared radiation. The display device typically comprises a surface across which the intersecting paths of radiation are directed. That surface is frequently designated a "touch control panel" since display graphics, or other information, may be ordered up from a controller in response to an operator's command in the form of a touching of, or pointing to, a particular area of the surface to interrupt light emanating from one or more of the light sources. Detection and analysis of such interruption serves to identify the X-Y coordinates of the interrupted light paths which, in turn, is determinative of the graphics to be displayed.

Figure 1:
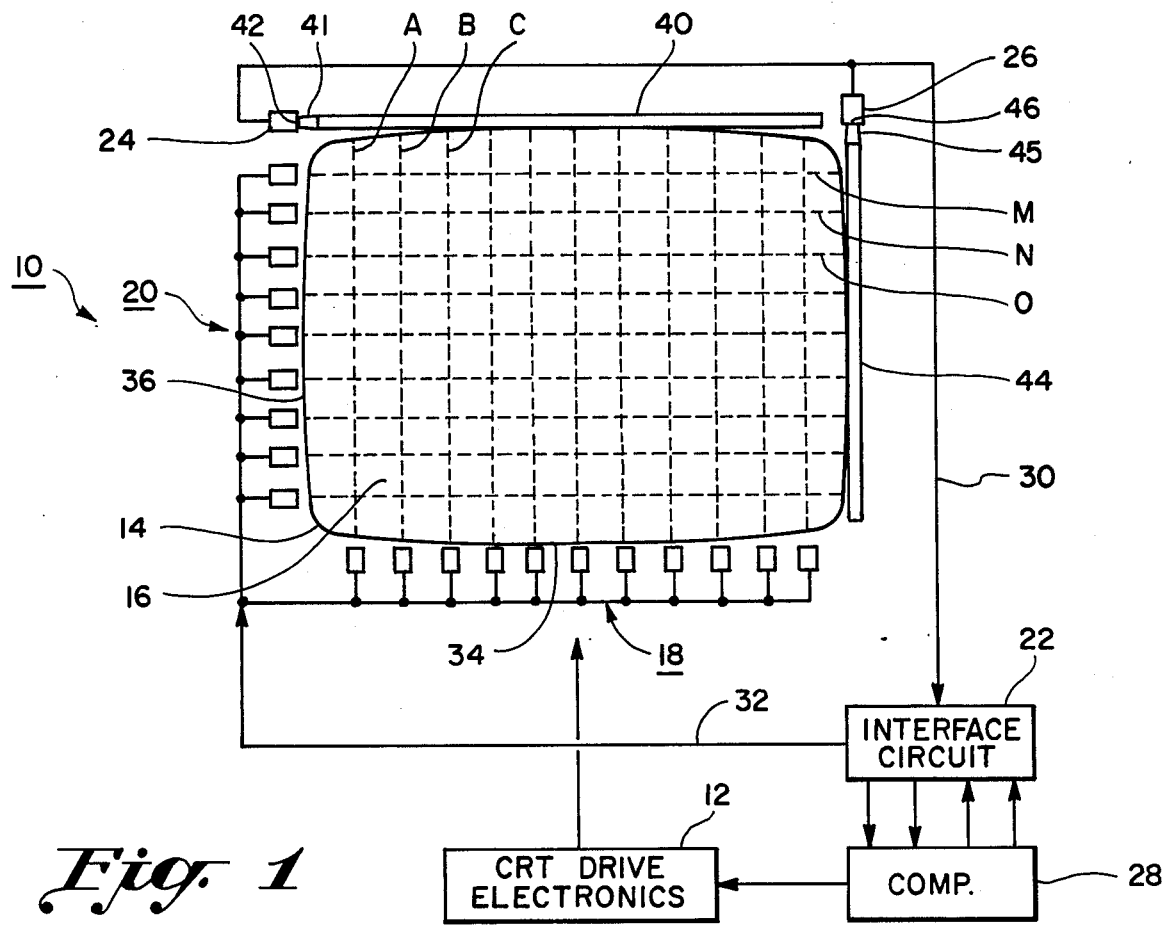
FIG. 1 depicts, partially in schematic form, a graphics display apparatus embodying the invention.

FIG. 1 depicts a graphics display apparatus 10 of the type adverted to above. Apparatus 10 comprises a graphics controller 12 and a display device 14 having a display surface 16. As noted above, since the device conventionally employed to display graphics is a CRT, the subject invention will be described in that environment. However, it is to be appreciated that the invention is readily applicable to other display devices, e.g., plasma panels, liquid crystal displays, projection screen displays, electroluminescent devices, etc., any of which can be employed in lieu of a CRT.

Apparatus 10 also includes first and second sources of radiant energy 18, 20, more specifically described below, which are disposed along adjacent edges of display surface 16. An interface circuit 22 is provided for stimulating the radiant energy sources to generate, effectively, a plurality of apparent discrete, time-sequentially occurring light sources collectively disposed along adjacent edges of display surface 16 for sourcing a like plurality of light paths individually associated with an assigned one of said light sources. In a manner detailed below each light path is defined, conjointly by its associated light source and a light collector arranged to accept only that light arriving within a predetermined range of angles centered upon a straight line extending from that light source. As a result, first and second groups of parallel light beams extend across display surface 16, the two groups intersecting, preferably at right angles. Radiant energy sensing means, in the form of the light sensors 24, 26, respond to light energy directed thereto by the aforementioned light collector which is constructed in accordance with the invention and which is fully described below.

Apparatus 10 further includes a computer 28 for rendering the interface circuit 22 operative in a patterned sequence so that when an interruption of a light path is detected by a light sensor and fed back to the computer, via interface circuit 22, the location of that interruption is identifiable by the computer.

Controller 12 comprises the drive electronics for the CRT and, to that end, serves to amplify and otherwise condition the output of computer 28. To achieve its functions, the computer comprises a clock (source of timing signals), a source of video information, as well as sources of horizontal and vertical sync pulses. The output of controller 12 is coupled to the control electrodes of CRT 14, as well as to the CRT's deflection windings, to display, under the direction of the computer, selected graphics. Accordingly, when the computer identifies the location, or address, of light path interruptions, it will then output the appropriate video information to controller 12 to change the video display to that associated with the address touched by the operator.

As shown in FIG. 1, interface circuit 22 has input and output terminals coupled to computer 28, an input terminal coupled, via a buss 30, to light sensors 24, 26 and an output terminal coupled to radiant energy sources 18, 20 via the bus 32. Circuit 22, in response to timing signals from computer 28, outputs firing signals that stimulate radiant energy sources 18, 20 via buss 32 in a patterned sequence so that the location of a subsequent interruption of a particular light path is identifiable.

To more particularize the foregoing, the first source of radiant energy 18 is disposed along a first edge 34 of CRT display surface 16 while the second source of radiant energy 20 is disposed along a second adjacent edge 36 of surface 16. When stimulated each of energy sources 18 and 20 generates, effectively, a plurality of apparent discrete, time-sequentially occurring light sources collectively disposed along respective edges 34, 36 of display surface 16.

In a practical realization of the invention, energy sources 18, 20 each comprise a bank of light emitting diodes (LED's), arranged as depicted in FIG. 1. The source 18 LED's serve to source a like plurality of light paths A, B, C . . . , individually associated with an assigned LED, and extending across surface 16 parallel to the minor, or vertical, axis of that surface. Each of light paths A, B, C . . . is defined, conjointly, by its associated LED and by a light collector, fully described below, arranged to accept only that light arriving within a predetermined range of angles centered upon a straight line extending from its associated LED.

In like fashion, the source 20 LED's source a plurality of light paths M, N, O . . . , likewise individually associated with an assigned LED and extending across surface 16 parallel to the major, or horizontal, axis of surface 16 to orthogonally intersect paths A, B, C . . . Each of light paths M, N, O . . . is also defined conjointly, by its associated LED and by a light collector, described below, arranged to accept only that light arriving within a predetermined range of angles centered upon a straight line extending from its associated LED.

Preferably, to conserve space, each bank of LED's is mounted in a common curvilinear plane, although that is not to be construed as a limitation to the invention.

Alternatively, instead of resorting to a multiplicity of LED's as discrete light sources, advantage can be taken of the invention described and claimed in co-pending application Ser. No. 340,604, which was filed on Jan. 19, 1982 now U.S. Pat. No. 4,459,476. That invention teaches replacing the LED's with radiation-emissive material in the form of strips of material which are disposed within a CRT envelope along adjacent edges of the display surface. More particularly, and as disclosed in the '476 patent, the strips of radiation emissive material are deposited inside the tube envelope at, or near, the point where the edge of the display surface meets or blends with the envelope funnel. The strips emit radiation upon being excited by a travelling spot of energy, for example, an electron beam. The '476 patent details the manner in which the phosphor material is excited to issue radiant energy, as well as the manner in which light sensors are disposed for response to the radiated energy. There are also disclosed methods for electron beam scanning the strips by computer control, so that, effectively, a plurality of apparently discrete, time-sequentially occurring light sources are caused to appear along both strips. Since the computer controls the sequence in which the strips are excited, it can identify signals attributable to particular ones of the time-sequentially occurring light sources. Accordingly, the absence of timely signals from the sensors can be interpreted by the computer as an interruption of known light paths. Therefore, the X-Y coordinates of the interruption are identifiable.

Figure 2A:
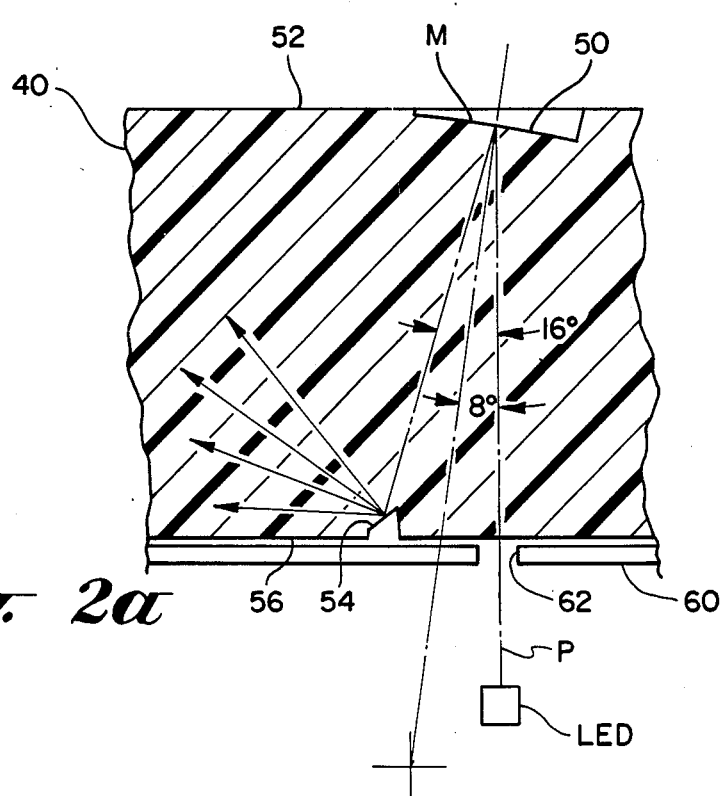
FIG. 2a is a sectional view taken along lines 2a—2a, in FIG. 2, illustrating one pair of light focusing and reflecting elements.
Figure 2:
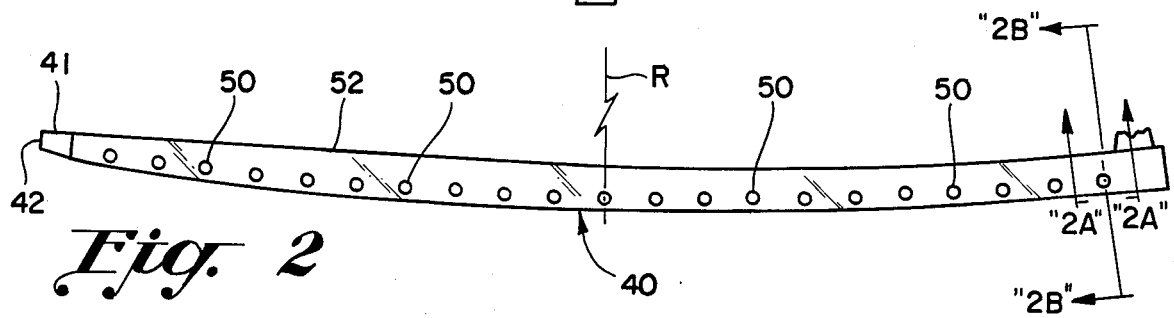
FIG. 2 is a plan view of a light guide constructed in accordance with the invention.
Figure 3:
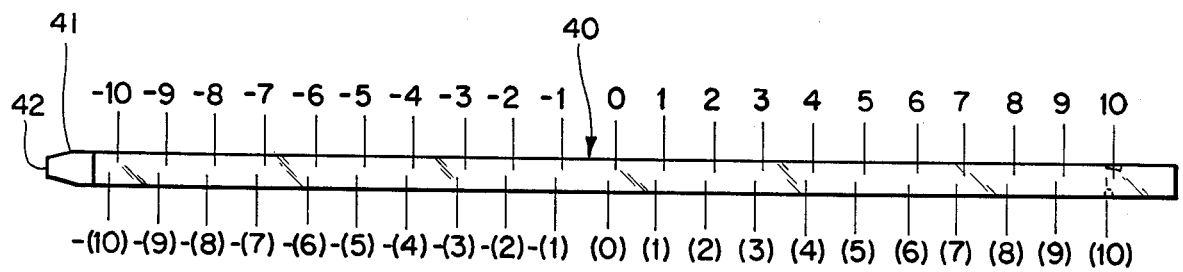
FIG. 3 is an elevational view of the light guide shown in FIG. 2.

As shown in FIG. 1, there is disposed along that edge of display surface 16 opposite light source 18 a first light collector means which includes a guide 40 in the form of an elongated arcuate strip of light transmissive material, such as plexiglass grade V920, see also FIG. 2. Light guide 40 comprises a main body portion of substantially constant cross-section, see FIG. 2b, that merges with a tapered end section 41 which is terminated by a light collection station 42 that confronts light sensor 24. This taper results in a reduced cross-sectional area for the light collection station, thus permitting use of a conventional, relatively inexpensive, photodiode for a light sensor. As significantly, the taper is chosen so as to afford a transition from the main body of the guide to the light collection station that will ensure that the internally reflected light rays traversing the length of the guide will not be subjected to angles of reflection exceeding the critical angle which would permit the light rays to exit from the guide.

In practice, sensor 24 is cemented to the end of station 42 by a transparent adhesive to most efficiently utilize the light collected by guide 40. A second similarly formed arcuate, but shorter, light guide 44 is disposed along that edge of display surface 16 opposite light source 20 and it also comprises a tapered end section 45 which is terminated by a light collection station 46 that confront light sensor 26. In like fashion, and for the same reason, sensor 26 is cemented to station 46.

The disparity in lengths of the two guides is dictated, of course, by the fact that the display surface (in the disclosed embodiment) is the rectangular faceplate of a CRT. For the same reason, the guides adopt the arcuate construction to conform to the curvature of a conventional CRT faceplate which, in practice, comprises a section of a sphere. Thus the curvature, or arc, of the light guides has a radius determined by the radius of curvature of its associated CRT face plate. It is also for this reason that, as mentioned above, each bank of LED's is mounted in a common curvilinear plane.

On the other hand, if the practioner opted for a display device having a flat panel, then, of course, a rectilinear formed guide would be in order. In any event, with guides 40, 44 disposed in the fashion depicted in FIG. 1, light intercepted by the guides, will, in a manner to be described, be redirected to respective light collection stations 24, 26.

As noted, except for length, light guides 40, 44 are basically similar. Therefore, a detailed description will be given only for guide 40 which description, of course, is applicable to guide 44. More particularly, and with reference to FIG. 2, light guide 40 is seen to comprise an arcuate array of discrete focusing elements 50 which are formed, and equally spaced, along the face 52 of guide 40, that is, the guide face more distant from light source 18. It is to be appreciated, of course, that the focusing elements need not necessarily be implanted into the guide. For guide 40 the number of focusing elements 50 in its array is equal to the number of LED's in light source 18. By the same token, the number of focusing elements in guide 44 matches the number of LED's in light source 20. Each element 50 is individually affiliated with an assigned LED, as graphically depicted in FIG. 1, by one of light paths A, B, C . . . .

In the principal embodiment each of focusing elements 50 is configured as a concave mirror for collecting and focusing that light arriving within a defined light path extending from its affiliated LED. More particularly, and with reference to FIG. 2a, each of the aforesaid light paths is defined, conjointly, by its associated LED and by a focusing element 50 which is arranged to accept only that light arriving there at a predetermined range of angles centered upon a straight line P extending from element 50 to the depicted LED and at right angles to surface 56 of the guide. For a light guide having the dimensions catalogued below, an acceptable range of angles would be ±1.3 degrees, centered on line P and looking back from element 50 to the LED. Desirably, the back of mirror 50 is metallized, as indicated by the reference alpha M in FIG. 2a, to enhance its reflectivity.

Guide 40 further comprises a like array of discrete reflector elements 54 which are formed as equally spaced planar mirrors along that face 56 of guide 40 which is disposed opposite to, and parallel to face 52, see FIG. 2a. It is appreciated, of course, that planarity of reflector elements 54 is not absolute; a departure to some concavity, or convexity, is acceptable. Each reflector mirror 54 is individually associated with and located at, or close to, the focal plane of an assigned one of focusing mirrors 50 so that a mirror pair is established for each light path. The planar mirror serves to receive light collected by its focusing mirror 50 and to redirect that light toward light collection station 42.

A particularly advantageous arrangement for such a mirror pair is detailed in FIG. 2a. Planar mirror 54 is so positioned that light arriving along the aforementioned path P and reflected by concave mirror 50 is focused upon the center of mirror 54, and its transverse dimensions are so chosen that only light arriving within the aforementioned acceptable range of angles around path P can strike its surface. Light arriving at larger angles with respect to path P misses the planar mirror and strikes guide surface 56 under a steep angle so that total reflection does not occur and such light is not retained in the guide.

In an actual reduction to practice of the invention the geometric central axis A of mirror 50 is tilted forward, that is toward collection station 42, by approximately 8 degrees. In other words, the axis of mirror 50 is tilted 8 degrees relative to path P. In order to achieve total internal reflection of the focused light received from mirror 50, reflector mirror 54 is tilted at an angle to guide surface 56, specifically, at an angle of 37 degrees (45 degrees−8 degrees). With this orientation for mirror 54, a central light ray received from its focusing mirror 50 is redirected along a path, substantially parallel to the central axis of the guide, at the location of the particular mirror pair, to light collection station 42. Additionally, the aforesaid angular relationships, in conjunction with the mirrors dimensional parameters ensure that the outer rays received from focusing mirror 50 are reflected at angles that ensure their total internal reflection on their way to light collection station 42.

Figure 2B:
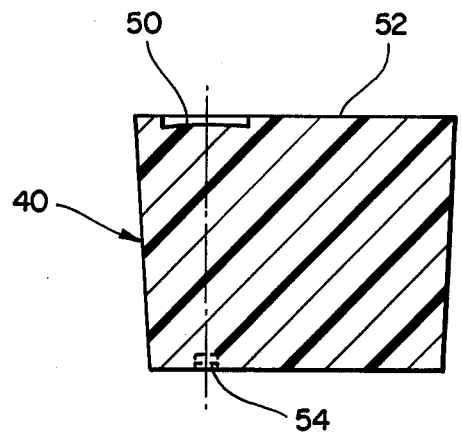
FIG. 2b is a cross-sectional view of the light guide taken along lines 2b—2b in FIG. 2 and depicting an end view of one pair of light focusing and reflecting elements.
Figure 4:
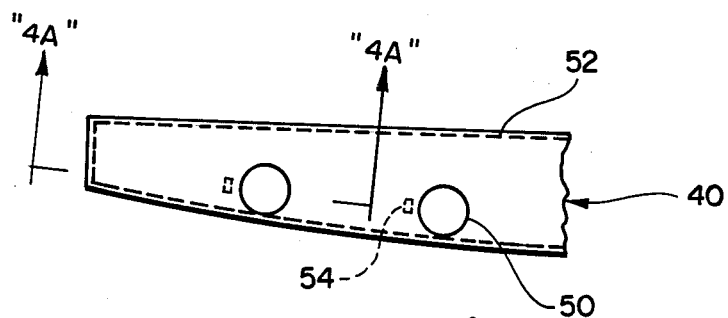
FIG. 4 is a fragmentary representation of the tapered end of the light guide shown in FIG. 2.
Figure 4A:
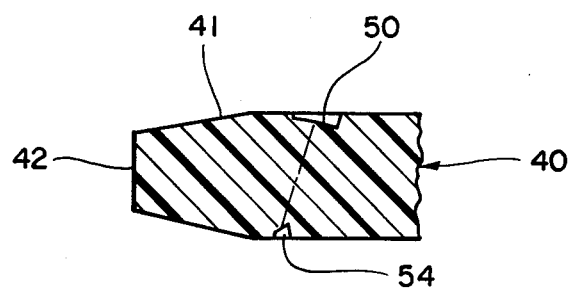
FIG. 4a is a sectional view taken along lines 4a—4a in FIG. 4 depicting a side view of an end pair of light focusing and reflecting elements.

At this juncture it should be noted that the array of focusing mirrors 50 and the array of reflecting mirrors 54 are disposed along arcuate paths that are offset from the central arcuate axis of the guide, see FIGS. 2, 2b and 4. The reason for this construction is to ensure that non-parallel light redirected toward station 42 by a reflecting mirror 54 will encounter the closely adjacent side wall of the guide at a shallow angle thus ensuring total internal reflection of such light.

The advantages of the recited construction for the mirror pair are, at least, two-fold: first, the placement and dimensioning of the mirrors are such that they pose but a minimal obstacle to both the acceptable light rays entering the guide as well as the redirected light rays traversing the guide and, secondly, the angular positioning and dimensioning of the mirrors ensure total internal reflection of the light collected and redirected by the mirror pair.

In general, a light guide with parallel surfaces has the property that light which enters through those surfaces is not totally reflected within the guide and thus is soon lost. In a guide constructed according to the present invention this rule generally applies. However, it is possible for light arriving under certain angles at specific portions of surface 56 to strike one of mirrors 50 in such a way that the reflected light, while missing planar mirror 54 by a wide margin, is totally reflected by surface 56 and thus remains within the guide. To suppress this source of potential interference, a thin shield 60, see FIG. 2a, in the form of a sheet of black paper having an array of ports 62, in registration with the light paths issuing from the source 18 LED's and apertured to pass only light confined to the aforementioned path P, can be fitted to surface 56 of the light guide.

By way of an exemplification of the invention, but not to be construed as limiting in any way, a light guide 40 actually reduced to practice for use with a 9"V CRT display device has the following specifications:

| | |
|---|---|
| Radius R (see FIG. 2) arcuate array of mirrors 50 | 27.1" |
| Number of mirrors 50 (and mirrors 54) | 21 |
| Mirror 50 to mirror 50 spacing | .295" |
| Mirror 54 to mirror 54 spacing | .295" |
| Overall length, guide 40 | 6.7" |
| Transverse Dim., guide 40 (approx.) | .200" × .262" |
| Index of Refraction, guide 40 (approx.) | 1.49 |
| Diameter, mirror 50 | .07" |
| Spherical radius, mirror 50 | .393" |
| Mirror pair spacing, center-to-center (Mirror 50 - mirror 54) | .054" |
| Planar mirror 54 | .0116" × .015" |
| Light station 42 | .12" × .12" |

Figure 5:
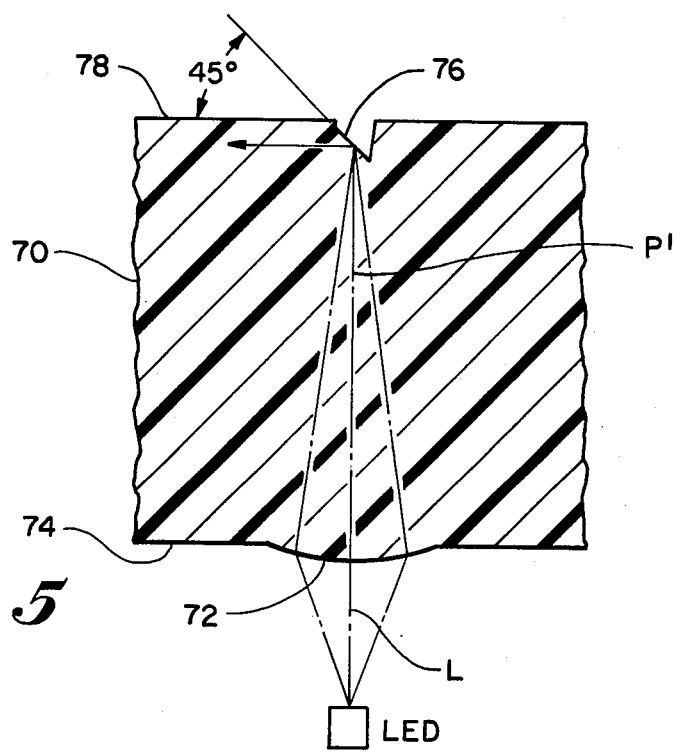
FIG. 5 is a sectioned view of a light guide employing an alternate construction for the light focusing and reflecting elements.

FIG. 5 depicts an alternate construction for a focusing element - reflecting element pair that utilizes the basic principles of the invention. More particularly, there is disclosed a fragment of a light guide 70 formed of light transmissive material in which the focusing element of the pair comprises a lens 72 formed in face 74 of the guide while the reflecting element comprises a planar mirror 76 formed in face 78 of the guide and metallized to enhance reflectivity. As illustrated, the central axis L of the lens is normal to guide face 74 and it passes through the geometric center of mirror 76. The plane of mirror 76 intersects the lens axis L at substantially 45 degrees to ensure that a central light ray received from lens 72 is redirected on a line parallel to the central axis of the guide. As in the principal embodiment, the dimensional parameters of lens 72 and mirror 76 are selected to the end that only light rays arriving at the lens within the previously discussed acceptable range of angles about a predetermined light path P', which in this case coincides with lens axis L, will be accepted and redirected to the light collection station at the terminus of guide 70.

Insofar as an exemplification of this embodiment is concerned, it would adopt substantially the same dimensions and parameters set forth above for the principal embodiment. However, the radius of curvature for lens 72 would be approximately six times smaller than that of focusing element 50, i.e., 0.393"/6 or 0.065". Since the spherical aberration of a lens that small may be inconveniently large, the problem can be resolved by increasing the cross section of the guide which, of course, would increase the radius of curvature of the lens proportionately.

Although the invention has been described previously in terms of a preferred and an alternate embodiment, it will be obvious to those skilled in the art that changes and modifications may be made without departing from the invention in its broader aspects. Accordingly, it is intended that all such changes and modifications be considered as within the spirit and scope of the invention as defined by the appended claims.

What is claimed is:

1. In a touch panel graphics display apparatus having means for producing a plurality of substantially parallel light beams directed across a display surface of said apparatus, an improved light collector means for collecting light in said light beams and for redirecting it in a substantially common direction substantially perpendicular to said light beams for detection by a common detector means positioned adjacent one end of said collector, said light collecting and redirecting means comprising:

an elongated strip of light transmissive material having a longitudinal axis, and being terminated by a light collection station;

a plurality of light reflecting elements disposed inside and spaced along one side of said strip and having a transverse dimension small in comparison to said strip cross-section, the surface of each said reflecting element being tilted with respect to said longitudinal axis of said strip;

a like plurality of focusing elements disposed along said strip and individually associated with an assigned one of said reflecting elements, each said focusing element being oriented and configured to collect light received in a direction substantially perpendicular to said longitudinal axis of said strip and to direct such collected light to said reflecting element assigned to said focusing element, each said focusing element being spaced from its assigned reflecting element a distance such that said reflecting element is positioned at, or close to, the focal plane of its assigned focusing element, each said reflecting element being so tilted as to direct light received from its assigned focusing element to said light collection station.

2. In a graphics display apparatus having:

a display device having a display surface, a radiant energy source means, and means for stimulating said radiant energy source to generate, effectively, a plurality of apparent discrete, time-sequentially occurring light sources collectively disposed along at least one edge of said display surface for producing a like plurality of light paths each of said light paths being individually associated with an assigned one of said light sources, each said light path being defined, conjointly, by its said associated light source and by a light collector means arranged to accept only that light arriving within a predetermined range of angles centered upon a straight line extending from said associated light source to said collector means, said light paths extending across said display surface, radiant energy sensing means responsive to the output of said light sources and means for rendering said stimulating means operative in a patterned sequence so that the interruption of a particular one of said light paths is identifiable, said display surface serving to display graphics in response to an operator's command in the form of a pointing to a particular area of said display surface, which pointing interrupts at least one of said light paths, the improvement comprising:

light collector means comprising an elongated strip of light transmissive material terminated by a light collection station confronting said radiant energy sensing means, said collector means being disposed along that edge of said display surface which is opposite said one edge for directing light intercepted from any of said plurality of light sources, to said collection station, provided that said intercepted light arrives at said collector within one of said defined light paths, said light collector means further comprising an array of discrete focusing elements disposed along a face of said strip, each of said focusing elements being individually associated with an assigned one of said light sources, each said focusing element being configured to collect and focus light arriving within that one of said defined light paths extending from said light source associated with said focusing element, and a like array of discrete reflecting elements formed within said strip and adjacent a boundary thereof, each said reflecting element being individually associated with and located at, or close to, the focal plane of an assigned one of said focusing elements for receiving said focused light collected by its said assigned focusing element and for redirecting said received light toward said light collection station, the position, orientation and transverse dimensions of each said reflecting element being so chosen that only light arriving within its said associated focusing element's assigned light path is redirected by said reflecting element.

3. In a graphics display apparatus having:
a display device having a display surface,
a radiant energy source means,
and means for stimulating said radiant energy source to generate, effectively, a plurality of apparently discrete, time-sequentially occurring light sources collectively disposed along at least one edge of said display surface for producing a like plurality of light paths individually associated with an assigned one of said light sources, each said light path being defined, conjointly, by its said associated light source and by a light collector means arranged to accept only that light arriving within a predetermined range of angles centered upon a straight line extending from said associated light source to said collector means, said light paths extending across said display surface, radiant energy sensing means responsive to the output of said light sources and means for rendering said stimulating means operative in a patterned sequence so that the interruption of a particular one of said light paths is identifiable, said display surface serving to display graphics in response to an operator's command in the form of a pointing to a particular area of said display surface, which pointing interrupts at least one of said light paths, the improvement comprising:

said light collector means comprising a light guide in the form of an elongated strip of light transmissive material terminated by a light collection station confronting said radiant energy sensing means, said light guide being disposed along that edge of said display surface which is opposite said one edge, said light guide serving to direct light intercepted from any of said plurality of light sources, to said collection station provided that said intercepted light arrives at said light guide within one of said defined light paths, said light guide comprising an array of discrete focusing elements formed along one face of said light guide, each of said focusing elements being individually associated with an assigned one of said light sources, each said focusing element being configured to collect and focus light arriving within that one of said defined light paths extending from said light source associated with said focusing element, and a like array of discrete reflecting elements formed along that face of said light guide opposite said one face, each said reflecting element being individually associated with and located at, or close to, the focal plane of an assigned one of said focusing elements for receiving said focused light collected by its said assigned focusing element and for redirecting said received light toward said light collection station, the position, orientation and transverse dimensions of each said reflecting elements being so chosen that only light arriving within its said associated focusing element's assigned light path is redirected by said reflecting element.

4. In a graphics display apparatus having:
a display device having a display surface,
a first source of radiant energy,
means for stimulating said radiant energy sources to generate, effectively, a first plurality of discrete, time-sequentially occurring light sources from said first source of radiant energy which are collectively disposed along a first edge of said display surface for producing a first plurality of light paths individually associated with an assigned one of said first light sources, each of said first plurality of light paths being defined, conjointly, by its said associated light source and by a first light collector means arranged to accept only that light arriving within a predetermined range of angles centered upon a straight line extending from its said associated one of said first plurality of light sources to said first collector means, and to generate a second plurality of discrete, time-sequentially occurring light sources from said second source of radiant energy which are collectively disposed along a second edge of said display surface for producing a second plurality of light paths individually associated with an assigned one of said second light sources, each of said second plurality of light paths being defined, conjointly, by its said associated light source and by a second light collector means arranged to accept only that light arriving within a predetermined range of angles centered upon a straight line extending from its said associated one of said second plurality of light sources to said second collector means, said first and second pluralities of light paths extending across said display surface, first and second radiant energy sensors individually responsive to the output of said first and second pluralities of light sources, respectively, and means for rendering said stimulating means operative in a patterned sequence so that the interruptions of particular ones of said light paths are identifiable, said display surface serving to display graphics in response to an operator's command in the form of a pointing to a particular area of said display surface, which pointing interrupts at least one light path associated with each of said first and second pluralities of light sources, the improvement comprising:

said first light collector means comprising a first light guide in the form of an elongated strip of light transmissive material terminated by a first light collection station confronting said first radiant energy sensor, said first light guide being disposed along that edge of said display surface which is opposite said first edge for directing light intercepted from any of said first plurality of light sources to said first light collection station provided that said intercepted light arrives at said first light guide within one of said first plurality of defined light paths, said first light guide comprising an array of discrete focusing elements formed along one face of said first light guide and individually associated with an assigned one of said first plurality of light sources, each said focusing element of said first light guide being configured to collect and focus light arriving within that one of said first plurality of defined light paths extending from that one of said first plurality of light sources associated with said focusing element;

said first light guide further comprising a like array of discrete reflecting elements formed along that face of said first light guide opposite said one face, each said reflecting element of said first light guide being individually associated with and located at, or close to, the focal plane of an assigned one of said first light guide focusing elements for receiving said focused light collected by its said assigned focusing element and for redirecting said received light toward said first light collection station, the position, orientation and transverse dimensions of each of said first light guide reflecting elements being so chosen that only light arriving within that one of said first plurality of defined light paths extending from that one of said first plurality of light sources assigned to said focusing element of said reflecting element is redirected by said first guide reflecting elements; and said second light colector means comprising a second light guide likewise in the form of an elongated strip of light transmissive material terminated by a second light collection station confronting said second radiant energy sensor, said second light guide being disposed along that edge of said display surface which is opposite said second edge for directing light intercepted from any of said second plurality of light sources to said second light collection station, provided that said intercepted light arrives at said second guide within one of said second plurality of defined light paths, said second light guide comprising an array of discrete focusing elements formed along one face of said second light guide and individually associated with an assigned one of said second plurality of light sources, each said focusing element of said second light guide being configured to collect and focus only light arriving within that one of said second plurality of defined light paths extending from that one of said second plurality of light sources associated with said focusing element;

said second light guide further comprising a like array of discrete reflecting elements formed along that face of said second light guide opposite said one face, each said reflecting element of said second light guide being individually associated with and located at, or close to, the focal plane of an assigned one of said second light guide focusing elements for receiving said focused light collected by its said assigned focusing element and for redirecting said received light toward said second light collection station, the position, orientation and transverse dimensions of each of said second light guide reflecting elements being so chosen that only light arriving within that one of said second plurality of defined light paths extending from that one of said second plurality of light sources assigned to said focusing element of said reflecting element is redirected by said second guide reflecting elements.

5. The improvement set forth in claim 2 in which said focusing elements are equally spaced along said one face of said light guide and said reflecting elements are equally spaced along said light guide face opposite said one face.

6. The improvement set forth in claim 2 in which said light guide has an configuration corresponding to the contour of said display surface.

7. The improvement set forth in claim 2 in which said light guide comprises a tapered section interposed between said array of reflecting elements and said light collection station for inhibiting loss of redirected light.

8. The improvement set forth in claim 2 in which each of said focusing elements comprises a curved mirror of predetermined radius and each of said reflecting elements comprises a planar mirror.

9. The improvement set forth in claim 8 in which each of said focusing elements comprises a metallized coating for enhancing collection of light arriving within said defined light path.

10. The improvement set forth in claim 8 in which the geometric central axis of each of said curved mirrors is tilted approximately 8 degrees relative to a normal to said light guide face along which said reflecting elements are formed.

11. The improvement set forth in claim 2 in which each of said focusing elements comprises a lens and each of said reflecting elements comprises a planar mirror.

12. The improvement set forth in claim 11 in which the central axis of each of said lenses is normal to said light guide face along which said lenses are formed, in which the geometric center of said planar mirror is coincident with said lens axis and in which the plane of said planar mirror is disposed at approximately 45 degrees to said lens axis.

13. The improvement set forth in claim 11 in which each of said planar mirrors comprises a metallized coating for enhancing redirecting of focused light collected by its associated lens.

* * * * *